3,809,688
PROCESS FOR THE POLYMERIZATION OF AN OLEFINE AT HIGH PRESSURE IN TUBULAR REACTORS
Anacleto Clementi, Saronno, and Roberto Battini, San Donato Milanese, Italy, assignors to Snam Progetti, S.p.A., San Donato Milanese, Italy
Filed Feb. 3, 1972, Ser. No. 223,105
Claims priority, application Italy, Feb. 3, 1971, 20,110/71
Int. Cl. C08f 1/60, 3/04, 1/88
U.S. Cl. 260—94.9 R 4 Claims

ABSTRACT OF THE DISCLOSURE

Ethylene is polymerized under a pressure of 1000 to 5000 atmospheres in the presence of catalyst and polymerization promoter in a tubular reactor having a preheating zone and a reaction zone from which a mixture including polyethylene and unreacted ethylene is continuously fed to an expansion tube whose internal diameter is substantially less than the internal diameter of the reaction zone tube and where the pressure and temperature of the mixture from the reaction zone is substantially reduced, then the polyethylene is separated from unreacted ethylene which is recycled.

---

Figure 1:
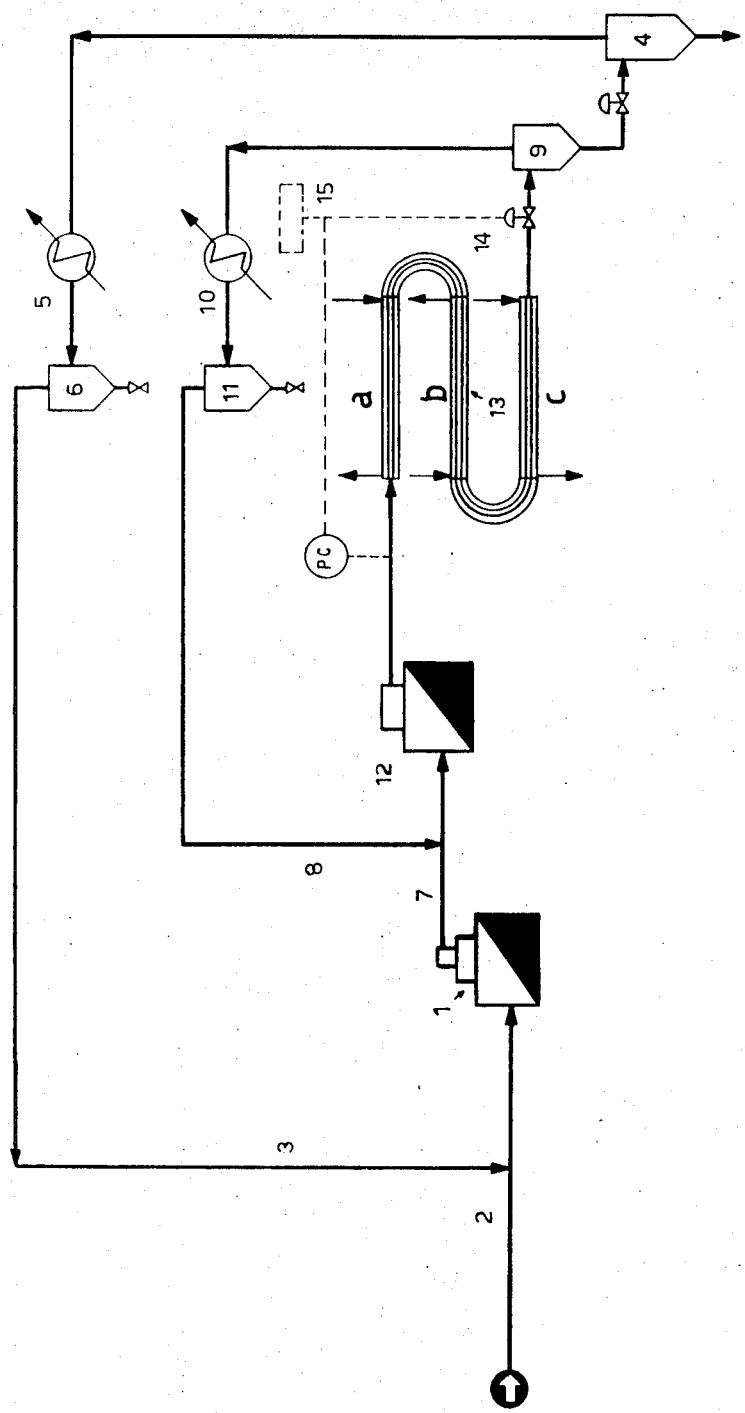

The present invention relates to a process for the polymerization of an olefine at high pressure in a tubular reactor. The olefine is preferably ethylene and the obtained polyolefine is low density polyethylene. In the following description for simplicity sake we will refer to the ethylene polymerization, even though this process is applicable to any other olefine.

In the art many processes are known for the polymerization of ethylene at high pressure in tubular reactors. Said processes are schematically exemplified in FIG. 1.

They consist essentially in compressing by means of a primary compressor 1 fresh ethylene 2 and the low pressure recycle ethylene 3, coming from the product separator 4 after cooling in 5 and purification from low molecular weight polymers in 6, up to a pressure of 200–400 atmospheres; said ethylene 7 together with the recycle ethylene 8, coming from the high pressure separator 9 after cooling in 10 and purification from the low molecular weight polymers in 11, by means of the secondary compressor 12 is brought to the reaction pressure and fed to the tubular reactor which has a remarkable length and is divided into three zones:

(a) A zone for preheating the gas from the temperature of the secondary compressor delivery to the temperature necessary for starting the reaction.

(b) A reaction zone wherein the polymerization of ethylene to polyethylene is effected.

(c) A zone for cooling the reaction mixture, said zone being necessary so that in the isoenthalpic expansion from the reactor pressure to the pressure of the high pressure separator 9 the mixture temperature does not reach such high values that an ethylene decomposition reaction is started.

At the end of the cooling zone there is a valve 14 which is periodically open according to a cycle regulated by timer 15 so as to increase quickly the reaction mixture velocity in order to carry away polymer and prevent the polymer deposits on the internal walls of the reactor cooling zone. The polymer formed in the reactor and separted from ethylene in the two separators, is subjected at the exit from the low pressure separator to the conventional finishing operations; for starting the radical polymerization of ethylene conventional catalysts as oxygen, peroxide, azo-compounds, besides chain transferring agents, are introduced together with fresh ethylene at known points of the process.

In conventional processes previously described polyethylene is obtained having a wide molecular weight distribution and containing high amounts of very high molecular weight polymers and of very low molecular weight polymers, which are responsible for deficiencies in the optical characteristics of the product and in its homogeneity.

The presence of polymers of such different molecular weights is due to the fact that the residence of the polymer and of ethylene in the cooling zone is protracted to allow the cooling of the reaction mixture down to temperature values which permit the isoenthalpic expansion of the mixture without the risk that its temperature exceeds the explosive decomposition temperature.

In said cooling zone there are present, besides polymer and unreacted ethylene, highly branched unsaturated byproducts and carbonyl products of catalysts decomposition, which products and by-products cause reactions of degradation, oxidation, cross-linking, branching of the polymer and therefore a deterioration of its optical and stability characteristics. Owing to the long residence of the reaction products in the cooling zone the polyethylene yields are rather low because of the formation of the aforesaid branched and oxidized products.

The isoenthalpic expansion, effected in conventional processes through a valve, brings the reaction products through intermediate stages having temperatures higher than the initial one, since the starting conditions of said mixture are above the inversion point of the Joule-Thompson effect; this brings the reaction mixture to conditions very near the ones of the ethylene unstability.

For reducing the risk of the spontaneous decomposition of ethylene due to the temperature increase during the isoenthalpic expansion, it is necessary, in the conventional processes, to cool the mixture before the expansion by remarkably increasing the reactor length; this causes an increase of the residence time of the polymer under the reaction conditions, not proportional to the reactor length, but on the contrary far longer. The necessity of said cooling brings another difficulty. In fact the increase of the reactor length and the external cooling create the conditions favorable to the deposit of the polymer on the reactor walls.

Hence there is the necessity for the reaction pressure to pulsate periodically at intervals of some seconds just for preventing and removing the polymer deposits produced during cooling.

The subject of the present invention is a process by means of which it is possible to eliminate the above mentioned drawbacks obtaining in that way high quality polyethylene with increased yields.

It has been surprisingly found that the cooling zone length can be sensibly reduced and the pressure pulsations eliminated, simply by substituting the pulsating expansion valve and/or the cooling tubular zone with an expansion device in the form of a tube whose internal diameter is of from ¾ to ⅒ of the internal diameter of the reactor, said expansion device being placed at the end of the reaction zone, before the high pressure separator. The tubular expansion device has essentially two functions:

(1) cooling the reaction products
(2) continuous discharge of the produced polymer to the zone of separation of the unreacted ethylene.

The first function is due to the fact that the mixture of polymer, ethylene and other possible by-products is subjected along said tube to a polytropic expansion with a consequent passage through subsequent stages at lower temperatures.

Said polytropic transformation is due to the fact that ethylene coming from the reactor pushes the polymer through the tube performing consequently a work and cooling down.

The polymer discharge is therefore, as said, effected by means of the push given by the high pressure ethylene in the reactor.

Since ethylene is subjected to said polytropic transformations and cools down, consequently the explosion risks are completely removed.

Figure 2:
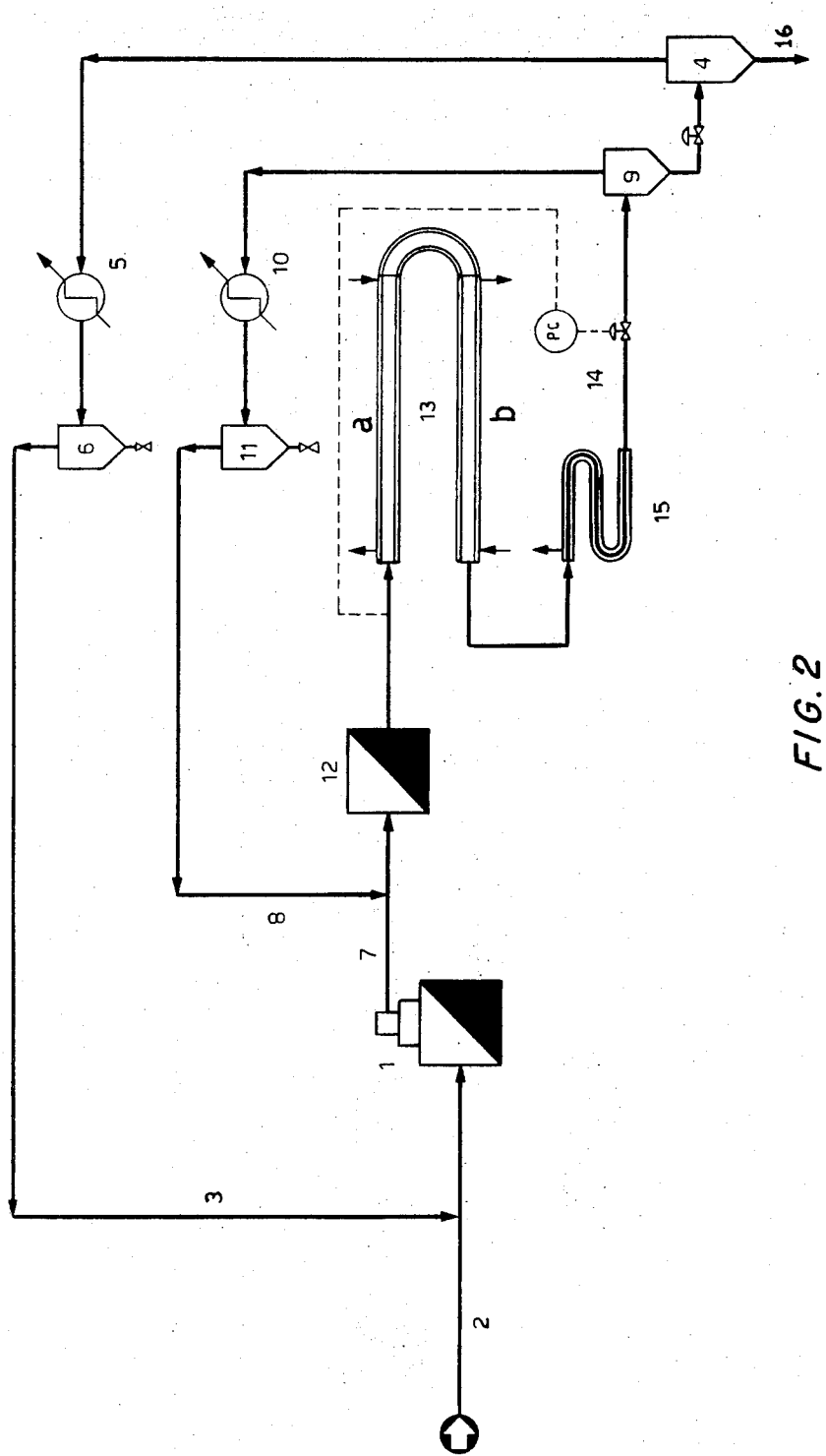

The process which is the subject of the present invention will be better understood with reference to the enclosed FIG. 2 which in any case must be considered as illustrative of the invention.

In said figure, 1 is the primary compressor, 2 is fresh ethylene, 3 is the recycle ethylene coming from the low pressure separator 4 of the polymer from the unreacted monomer, 7 is the delivery line of ethylene from the first compressor to the second compressor 12 whereto also recycle ethylene 8 is fed, coming from the high pressure separator 9. 5 and 10 are the coolers of ethylene separated from the polymer respectively at low and at high pressure. 6 and 11 are separators of low molecular weight polymers.

Ethylene leaving compressor 12 is fed into the reactor 13 which is divided in two zones a and b respectively of preheating and of reaction.

The mixture of polymer and unreacted ethylene leaves the reaction zone b and enters the tube 15 having a diameter smaller than that of the reactor, the polymer being continuously pushed owing to the pressure difference between the reactor and the separator.

The mixture enters then the high pressure separator 9 and the low pressure separator 4 from the bottom of which the polymer is discharged through 16, said polymer being then subjected to the subsequent working.

By using the process of the present invention the obtained advantages are the following ones:

(a) reduction of the total reactor length, with elimination of the most part of the section wherein there is the maximum polymer content; in general the length is reduced from 25% to 50%;
(b) remarkable reduction of the residence time of the polymer under the reaction conditions and therefore improvement of its characteristics;
(c) elimination of the pressure pulsations with a consequent increase of the mean reaction pressure; this causes a conversion increase;
(d) increase of the plant utilization factor;
(e) reduction of the investment costs;
(f) reduction of the production costs.

The small diameter tube (expansion device) placed at the reactor end can or cannot have a jacket and can or cannot be cooled by means of a fluid, in particular air or water, for further reducing the reaction mixture temperature in order to effect the separation of the polymer from the monomer at a pressure remarkably higher than the one of the conventional processes, i.e. between 200 and 1500 atmospheres and preferably between 500 and 1000 atmospheres.

In this manner it is possible to substitute for the reciprocating secondary compressors used in conventional processes, centrifugal compressors, with remarkable economical and operative advantages, besides a remarkable reduction of the ethylene compression energy.

The polymerization promoters are introduced together with fresh ethylene at determined points in the polymerization reactor.

As promoters we use oxygen, as noted above, and/or organic peroxides, azo compounds and other compounds adapted to give rise to free radicals.

In addition to ethylene, chain transferring agents can be present such as propane, butane, propylene, butene and comonomers such as vinyl acrylate, vinyl acetate and the like.

The polymerization can be effected at a temperature in the range of from 50° C. to 350° C., preferably from 100° C. to 300° C.; the pressure is in the range of from 1000 to 5000 atmospheres, preferably from 1500 to 3500 atmospheres.

For illustrative but unrestrictive purposes some examples will now be given.

EXAMPLE 1

1,000,000 parts of ethylene, containing 40 parts of oxygen and 20,000 parts of propylene, were introduced, according to the cycle of FIG. 1, into a tubular reactor at the temperature of 80° C. and at the pressure of 2,600 atmospheres together with 300 parts of octanoyl peroxide in a hydrocarbon solvent. In the reactor there was a pressure decrease of 15% every 30 seconds by means of periodical opening of expansion valve 14 placed at the reactor end; the mean residence time of the polymer in the reactor was about 90 seconds.

In the high pressure separator there was a temperature of 250° C. and a pressure of 250 atmospheres; the resulting polymer was 180,000 parts (conversion equal to 18%); the melting index was 2.5 g./10', the density at 23° C. was 0.924; the film presented a haze, calculated according to the rules ASTM D–1003, of 6.8; the resistance to the dart drop impact, according to the rules ASTM D–1709, was 80 g. and the number of visible inclusions was equal to 33 per square meter.

EXAMPLE 2

The operating conditions were the same as in Example 1 with the variant which is the subject of the present invention: reduction of the reactor length only to the reaction zone, installation of a cooled expansion device 15 after the reactor, according to the cycle shown in FIG. 2; the expansion device was placed before the regulation valve 14 of the reaction pressure; said valve did not open any more periodically for causing a strong acceleration of the reaction mixture; the mean residence time of the product in the reactor was therefore 30 seconds.

The pressure drop through the valve at the reactor bottom was reduced from 2100 to 500 atmospheres and added to the pressure drop of 1200 atmospheres occurring though the cooled expansion device, placed after the reactor and having an internal diameter equal to 1/3 of the one of the reactor.

The mixture temperature at the end of the cooled expansion device, placed after the reactor, was 200° C. and this allowed a good separation of the polymer from the unreacted gas in the high pressure separator wherein the pressure was 550 atm.

The resulting polymer was 200,000 parts (conversion equal to 20%), with a melt index of 2.4 g./10', a density of 0.924, a haze of 5.3, a resistance to the dart drop impact of 90 g. and a number of visible inclusions equal to 12 per square meter.

What is claimed is:

1. Process for the polymerization of an olefin at a pressure in the range of from 1000 to 5000 atmospheres in the presence of suitable catalysts and polymerization promoters in a tubular reactor, separating the polyolefine from the unreacted olefine, recycling the unreacted olefine and discharging the polymer, wherein the improvement comprises continuously expanding the reaction mixture of unreacted olefine, polyolefine and other compounds present in the reaction zone through a tubular expansion device whose internal diameter is from 3/4 to 1/10 of the internal diameter of the reactor, down to pressure values in the range from 200 to 1500 atmosphere and temperature values in the range from 170° C. to 300° C.

2. Process as claimed in claim 1 wherein the olefine is ethylene and the polyolefine is low density polyethylene.

3. Process as claimed in claim 1 wherein the final pressure of olefine after expansion through the tubular expansion device is in the range of from 500 to 1000 atmospheres.

4. Process as claimed in claim 1 wherein the olefine temperature after expansion through the tubular expansion device is in the range of from 180° C. to 250° C.

References Cited

UNITED STATES PATENTS

| | | | |
|---|---|---|---|
| 2,776,274 | 1/1957 | Cairns | 260—94.9 F |
| 3,631,017 | 12/1971 | Rettig et al. | 260—94.9 GC |
| 3,714,123 | 1/1973 | Mancini et al. | 260—94.9 R |
| 3,503,949 | 3/1970 | Gaspari | 260—94.9 R |
| 3,719,643 | 3/1973 | Knight | 260—94.9 R |
| 3,657,211 | 4/1972 | Steigerwald et al. | 260—94.9 R |

JOSEPH L. SCHOFER, Primary Examiner

A. HOLLER, Assistant Examiner

U.S. CL. X.R.

260—86.7, 87.3, 88.2 B, 94.9 F, 94.9 GD